(12) United States Patent
Fox et al.

(10) Patent No.: US 7,596,692 B2
(45) Date of Patent: Sep. 29, 2009

(54) CRYPTOGRAPHIC AUDIT

(75) Inventors: Barbara Lynch Fox, Seattle, WA (US);
David G. Conroy, El Granada, CA (US);
Brian A. LaMacchia, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 740 days.

(21) Appl. No.: 10/163,223

(22) Filed: Jun. 5, 2002

(65) Prior Publication Data
US 2003/0229781 A1    Dec. 11, 2003

(51) Int. Cl.
*H04L 29/00* (2006.01)
*H04L 29/12* (2006.01)
*H04L 29/06* (2006.01)

(52) U.S. Cl. .................. 713/155; 713/159; 713/156; 713/151; 713/150; 726/2; 726/3; 726/4; 726/5; 726/10; 709/229; 709/231; 709/235; 709/218; 709/219; 380/231; 380/284; 380/285

(58) Field of Classification Search ................. 713/155; 726/26–29
See application file for complete search history.

(56) References Cited

U.S. PATENT DOCUMENTS

| | | | | |
|---|---|---|---|---|
| 5,081,675 A * | 1/1992 | Kittirutsunetorn | ........... | 713/190 |
| 5,467,382 A * | 11/1995 | Schorman | ........... | 455/410 |
| 5,696,824 A * | 12/1997 | Walsh | ........... | 705/75 |
| 5,883,956 A * | 3/1999 | Le et al. | ........... | 713/170 |
| 5,903,652 A | 5/1999 | Mital | ........... | 380/25 |
| 5,953,652 A * | 9/1999 | Amin et al. | ........... | 455/410 |
| 6,041,411 A * | 3/2000 | Wyatt | ........... | 726/29 |
| 6,047,174 A * | 4/2000 | Frederick | ........... | 455/410 |
| 6,055,314 A | 4/2000 | Spies et al. | ........... | 380/21 |
| 6,064,737 A * | 5/2000 | Rhoads | ........... | 713/176 |
| 6,157,825 A * | 12/2000 | Frederick | ........... | 455/410 |
| 6,223,291 B1 | 4/2001 | Puhl et al. | ........... | 726/28 |
| 6,272,631 B1 | 8/2001 | Thomlinson et al. | ........... | 713/155 |
| 6,529,513 B1 * | 3/2003 | Howard et al. | ........... | 370/401 |
| 6,609,198 B1 * | 8/2003 | Wood et al. | ........... | 713/155 |
| 6,748,080 B2 * | 6/2004 | Russ et al. | ........... | 380/239 |
| 6,757,909 B1 * | 6/2004 | Maruo et al. | ........... | 725/111 |
| 6,889,385 B1 * | 5/2005 | Rakib et al. | ........... | 725/119 |

(Continued)

OTHER PUBLICATIONS

Schneier, "Applied Cryptography, Second Edition", John Wiley & Sons,Inc., 1996, pp. 185-186.*

(Continued)

*Primary Examiner*—Syed A. Zia
(74) *Attorney, Agent, or Firm*—Workman Nydegger (57) ABSTRACT

Method, system, and computer program products for identifying potentially fraudulent receivers of digital content. A receiver authenticates to an auditing service with data that should be unique to the receiver. The auditing service detects when multiple receivers attempt to authenticate with the same data, suggesting that a receiver has been cloned or duplicated. The audit service also detects when a receiver authenticates improperly, suggesting an unsuccessful and unauthorized attempt to duplicate an authorized receiver. Individual receivers may be networked together. To help protect a receiver's authentication data from tampering, at least a portion of the data may be digitally signed with a private key. The audit service may then verify the digital signature with a corresponding public key. Varying the order in which data is signed or where the data is stored from one receiver or group of receivers to another may provide an additional level of security.

29 Claims, 5 Drawing Sheets

U.S. PATENT DOCUMENTS

| | | | | |
|---|---|---|---|---|
| 6,937,729 | B2* | 8/2005 | Akins et al. | 380/239 |
| 6,938,171 | B1* | 8/2005 | Isomichi et al. | 726/12 |
| 6,963,590 | B1* | 11/2005 | Mann et al. | 370/535 |
| 6,978,022 | B2* | 12/2005 | Okimoto et al. | 380/211 |
| 6,983,377 | B1* | 1/2006 | Beesley et al. | 709/229 |
| 6,985,591 | B2* | 1/2006 | Graunke | 380/277 |
| 7,149,895 | B1* | 12/2006 | Asokan et al. | 713/159 |
| 2001/0021926 | A1* | 9/2001 | Schneck et al. | 705/54 |
| 2002/0124182 | A1* | 9/2002 | Bacso et al. | 713/200 |
| 2003/0005301 | A1* | 1/2003 | Jutzi et al. | 713/176 |
| 2003/0163693 | A1* | 8/2003 | Medvinsky | 713/169 |
| 2004/0103283 | A1* | 5/2004 | Hornak | 713/175 |
| 2005/0187880 | A1* | 8/2005 | Ezaki | 705/59 |
| 2006/0020783 | A1* | 1/2006 | Fisher | 713/156 |

OTHER PUBLICATIONS

Schneier, Applied Cryptography, Second Edition, pp. 185-186.*

A perspective: the role of identifiers in managing and protecing intellectual property in the digital age; Hill, K.; Proceedings of the IEEE (0018-9219) Jul. 1999. vol. 87,Iss.7;p. 1228.*

5C Digital Transmission Content Protection White Paper, Hitachi, Ltd. Intel Corporation, Rev. 1.0, Jul. 14, 1998, pp. 1-13.

Schneier, Bruce and Kelsey, John; Automatic Event-Stream Notarization Using Digital Signatures, *Security Protocols*, Cambridge, United Kingdom, Apr. 10-12, 1996 Proceedings, pp. 155-169.

Digital Transmission Content Protection Specification, vol. 1 (Informational Version), Hitachi, Ltd. Intel Corporation, Rev. 1.2, Jul. 11, 2001, pp. 1-71.

Ward, Christopher; Enterprise Security for the Web; *TI Technical Journal*, Jul.-Sep. 1997, pp. 48-52.

Pfleeger, Charles P. and Cooper, Deborah M.; Security and Privacy: Promising Advances, *IEEE Software*, Sep./Oct. 1997; pp. 27-32.

Ashley, Paul; Vandenwauver, Mark; and Broom, Bradley; A Uniform Approach to Securiing Unix Applications Using SESAME, *ACISP '98, the Third Australasian Conference on Information Security and Privacy*, Jul. 13-15, 1998, 6 pgs.

* cited by examiner

SYSTEM DATA STORE   228

| DEVICE UNIQUE SECRETS | | 310 |
|---|---|---|
| 192-bit HDD 3DES Key  312 | 1024-bit RSA Private Key  314 | |
| DEVICE UNIQUE NON-SECRETS | | 330 |
| 1024-bit RSA Public Key  332 | 16-byte Serial Number  334 | 2048-bit Service Provider Public Key  336 |
| 420-byte Certificate | | 338 |
| Reserved | | 342 |
| Device Birthmark | | 344 |

CRYPTOGRAPHIC AUDIT

CROSS-REFERENCE TO RELATED APPLICATIONS

N/A

BACKGROUND OF THE INVENTION

1. The Field of the Invention

The present invention relates to digital content broadcast systems. More specifically, the present invention relates to methods, systems, and computer program products for identifying potentially fraudulent digital content receivers.

2. Background and Related Art

One problem that subscription-based broadcast systems often face is theft of service. Theft of service occurs when someone is able to receive the benefits reserved for subscribers, without paying the associated cost. Illicit connections to cable systems and cloned receivers for satellite systems are examples of theft of service. Theft of service operates principally to the detriment of the service provider in the form of lost subscription revenue. A related problem, theft of content involves unauthorized use of content, independent of whether or not someone is a subscriber. Redistributing content to unauthorized consumers is an example of theft of content. Theft of content deprives the content owner of royalties or licensing revenue.

Theft of service is becoming increasingly significant with the improved quality of digital broadcasts. Furthermore, the advent of environments such as home media servers and networks with the ability to store and redistribute content to local nodes within the network amplify the problems associated with theft of service because, among other things, digital content is less susceptible to losses in quality than analog content. When digital content may be obtained, these and other advantages make theft of service an attractive prize.

Therefore, it is important to protect against theft of service. However, there is a practical economic limit to the resources that may be devoted to preventing theft of service. At some point, preventing theft of service is no longer economically viable because the added expense of the extra protection does not offer sufficient monetary return to justify its implementation. Thus, effective security measures that have low implementation costs are highly desirable.

BRIEF SUMMARY OF THE INVENTION

The present invention is useful in identifying potentially fraudulent receivers of digital content. At some point in time, receivers communicate with an auditing service. During this communication, the receivers authenticate to the auditing service. Because the authentication includes data that should be unique to each receiver, the auditing service is able to detect when multiple receivers attempt to authenticate with the same data, indicating that one or more receivers have been duplicated. Similarly, the auditing service is able to detect when a receiver authenticates improperly, indicating an unsuccessful attempt at duplicating an authorized receiver.

Individual receivers may be networked together, such as in a video network. Only one of the networked receivers need operate as a gateway for receiving broadcast digital content from a content source. Other local receivers may access digital content from the gateway receiver, rather than the broadcast source. The gateway receiver authenticates local receivers and stores corresponding representations of at least a portion of the authentication data. When the gateway receiver authenticates to the audit service, at least a portion of the stored authentication data for the local receivers is provided as well. By receiving authentication data for local receivers from gateway receivers, the audit service is able to detect potentially fraudulent local receivers, even if the audit service does not have any direct contact with the local receivers.

To help protect a receiver's sensitive and other data from tampering, at least a portion of the data may be digitally signed with a private key. This allows the audit service to verify the digital signature with a public key. Varying the order in which data is signed from one receiver or group of receivers to another may provide additional security. With this additional level of security, even if the security for one receiver is breached, other receivers remain secure. A further level of security may be achieved by varying the location where authentication data is stored from one receiver or group of receiver to another, scrambling the memory locations for accessing the data, and/or encrypting the data.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for identifying potentially fraudulent digital content receivers. By authenticating to an audit service with at least some data which should be unique to individual receivers, the audit service is able to identify when a receiver authenticates properly; when multiple receivers authenticate with the same data, suggesting an illicit attempt to copy an authorized receiver; when a receiver authenticates improperly, suggesting a failed attempt to copy an authorized receiver; when a receiver has not authenticated; etc. Embodiments of the present invention may comprise one or more special purpose or general purpose computers including various computer hardware, as discussed in greater detail below.

Embodiments within the scope of the present invention also include computer-readable media for carrying or having computer-executable instructions or data structures stored thereon. Such computer-readable media may be any available media that can be accessed by a general purpose or special purpose computer. By way of example, and not limitation, such computer-readable media can comprise RAM, ROM, EEPROM, flash memory cards, DVDs, CD-ROM, or other optical disc storage, magnetic cassettes, magnetic disk storage or other magnetic storage devices, which can be used to carry or store desired program code means in the form of computer-executable instructions or data structures and which can be accessed by a general purpose or special purpose computer.

The present invention may be described in the general context of computer-executable instructions, such as program modules, being executed by computers in network environments. Generally, program modules include routines, program, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention also may be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

In generally, the computer-executable instructions of a computer readable medium may comprise any instructions and/or data which cause a general purpose computer, special purpose computer, or special purpose processing device to perform a certain function or group of functions.

Figure 1:
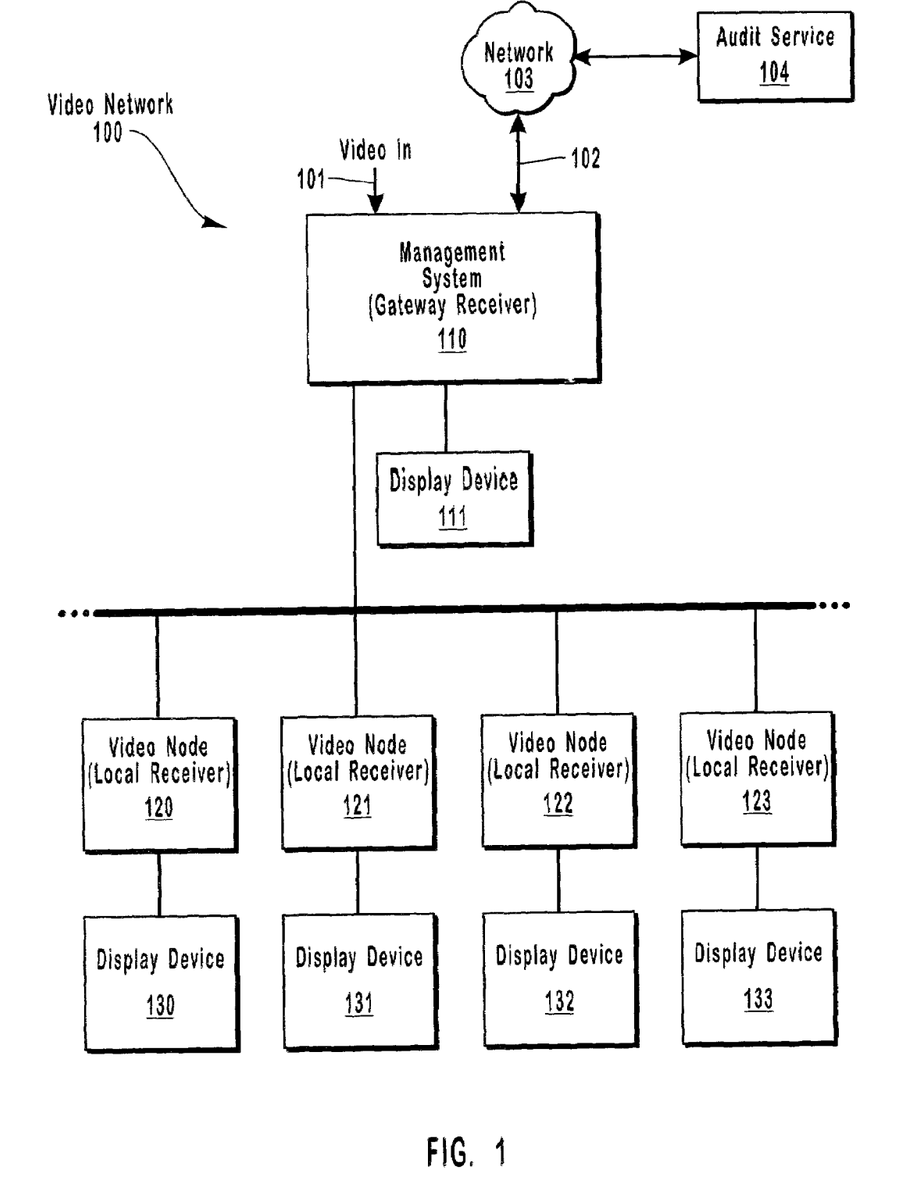
FIG. 1 shows an exemplary network of digital content receivers that provides a suitable environment for practicing the present invention.

FIG. 1 and the corresponding discussion provide a general description of a video network 100 in which the present invention may operate. The video network 100 includes a video management system 110 that receives video input 101, performs appropriate processing on the video, and then distributes the video directly to a display device 111 and/or to a video node such as one or more of video nodes 120-123. For video network 100, management system 110 functions as a gateway by receiving broadcast digital content through video input 101 and providing local receivers, such as video nodes 120-123, with access to the received digital content.

In general, the term "gateway receiver" will be used in referring to a receiver that usually receives digital content from a broadcast source, and the term "local receiver" will be used in referring to a receiver that usually receives digital content from a gateway receiver. It should be noted, however, that a receiver may operate as a gateway receiver at one time and as a local receiver at another. Therefore, in the broadest sense, "gateway" and "local" are used merely as labels to differentiate one receiver from another, without imposing any limitation on the operation of a receiver, whatsoever. It should be noted that the present invention does not necessarily require more than one receiver.

Communication between a gateway receiver, such as management system 110, and local receivers, such as video nodes 120-123, may be encrypted to secure any exchange of data, including digital content, encryption keys, etc. In one embodiment gateway receivers and local receivers mutually authenticate each other with public key certificates (which are more fully described in reference to FIG. 3) and by satisfying a challenge that requires use of a corresponding private key. A device birthmark (also described more fully in conjunction with FIG. 3) may be communicated during authentication. It should be noted that authentication usually implies identification using cryptographic techniques, but as used in this application, authentication may be interpreted more broadly to encompass more generalized forms of identification. The protocol for authentication may be modeled on well-known authentication mechanisms, including secure sockets layer ("SSL") transport layer security ("TLS"), and the like.

Video input 101 may be received from any of a variety of broadcast sources, including cable and satellite service providers. Although video input 101 may primarily receive video content, it should be understood that the present invention is not limited to any particular content. For example, it is becoming increasing popular for content providers to broadcast digital audio. Furthermore, broadcast streams may be multiplexed to allow for the broadcast of virtually any type of digital content, including executable software, scripts, marked up text and data, etc. The present invention does not require management system 110 to operate as a gateway receiver for any particular type of content. Similarly, video nodes 120-123 may be any type of consumer electronics device, including game consoles, tuners, recorders, personal computers, handheld computing devices, etc., capable of receiving content from a gateway receiver, such as management system 110. Which types of consumer electronics devices are suitable for use as a local receiver may depend on the type of digital content that management system 110 receives.

Typically, at least a portion of the digital content received by management system 110, is intended only for authorized receivers. In other words, management system 110 should have a valid subscription in order to receive certain digital content from the content service provider. In order to obtain digital content without subscribing, theft of service may be attempted, such as by cloning an existing authorized receiver or by creating a counterfeit receiver. For video network 100, an illicit gateway receiver or an illicit local receiver may be used for theft of service. How the present invention addresses theft of service will be discussed in more detail below, particularly in connection with FIGS. 3-5.

In addition to video input 101, video network 100 and management system 110 may connect to network 103 through connection 102. Whereas video input 101 usually is a one-way broadcast communication channel, connection 102 with network 103 supports two-way communication. In one embodiment, connection 102 is an Internet connection, but the present invention is not limited to any specific technology. At some point in time, management system 110 authenticates to audit service 104 through network 103. As part of this authentication, a gateway receiver may send all or a portion of a data store, such as data store 228 of FIG. 2, to the audit service 104.

This authentication permits audit service 104 to determine if multiple receivers provide the same authentication, suggesting that a gateway receiver has been cloned, and to determine if a gateway receiver authenticates improperly, suggesting a counterfeit gateway receiver. Of course, audit service 104 determines when a receiver properly authenticates, and also may determine if a receiver has not authenticated within a particular period of time. The connection between management system 110 and audit service 104 may be encrypted during authentication. For example, in one embodiment secure IP or IPsec provides for encrypted communication between management system 110 and audit service 104.

The local receivers, such as video nodes 120-123, authenticate to a gateway receiver, such as management system 110. The gateway receiver stores authentication data for each of the video nodes that authenticates. In one embodiment, this stored authentication data includes the public key for each authenticated video node. At least a portion or representation of this authentication data for the local receivers is sent to the auditing service 104 as well. The local receiver authentication data allows the audit service to identify potentially fraudulent local receivers, such as cloned and counterfeit local receivers. For example, receiving the same authentication data for multiple local receivers is an indication that local receivers are being cloned. If a local receiver provides invalid authentication to a gateway receiver, the gateway receiver may determine that access to digital content will not be allowed.

As used in this application, an audit service, such as audit service 104, should be interpreted broadly to encompass a wide range of operation. The audit service 104 need not comprise any particular hardware or software configuration. Audit service 104 need only include sufficient authentication information to authenticate gateway receivers. Audit service 104 may independently verify the authentication of local receivers or simply may accept representations of local receiver authentication data that are provided by a gateway receiver. Representations of local receiver authentication data include, but are not limited to, the local receiver authentication data that is received by a gateway receiver or portions thereof, data derived or calculated from the local receiver authentication data, etc., and/or combinations of the foregoing. The particular authentication information stored at audit service 104 depends largely on how gateway receivers (and possibly local receivers) authenticate. For example, in one embodiment audit service 104 stores a copy of the system data store 228 that is described below in connection with FIG. 2 and FIG. 3. Alternatively, audit service 104 may store only a portion of system data store 228 or data derived or calculated from the system data store 228 etc., and/or combinations of the foregoing.) More detail for examples of how gateway receivers and local receiver may authenticate will be provided below with respect to FIG. 3.

In one embodiment, video management system 110 has relatively high storage and processing capabilities as compared to the video nodes 120-123. Accordingly, the video management system 110 performs the bulk of the video processing on the video input. For example, the video management system 110 may decrypt, resize, and convert the input video to different formats as needed. In addition, the video management system 110 may process the video to minimize the memory and network bandwidth requirements of the video network 100. Video management system 110 may decrypt received content, re-encrypt the content using it own key, and write the content to a hard drive. The content remains in MPEG2 format. From the hard drive, the data may be decrypted and forwarded to an MPEG decoder for viewing, or decrypted and then re-encrypted for transmission to a video node that will perform the needed MPEG decoding.

Video nodes 120-123, on the other hand, have lower storage capabilities and perform more rudimentary video processing. For example, the video nodes 120-123 have the ability to tune to a video channel and supply such tuning information to the video management system 110 or to request channel selection at the video management system 110. In addition, the video nodes 120-123 receive processed video from the video management system 110, prepare the processed video for display on the corresponding display device 130-133, and then forward the final processed video to the corresponding display device. In one embodiment, video nodes 120-123 receive and decode MPEG2 video for display. Accordingly, the complexity of the video management system 110 allows for relatively less complex designs in the video nodes 120-123. For example, video nodes 120-123 do not to decrypt the incoming broadcast content, manage a hard disk, etc.

Figure 2:
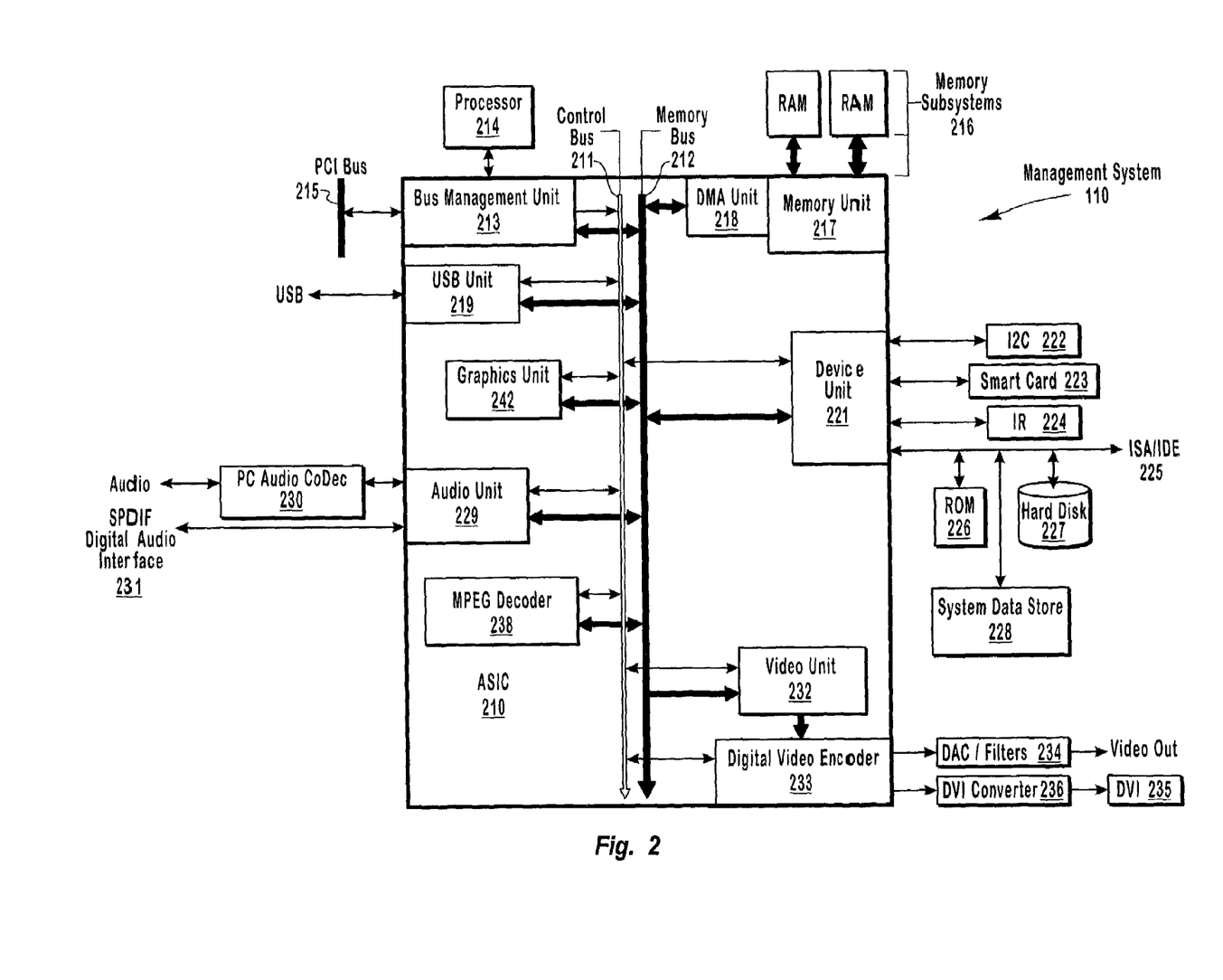
FIG. 2 illustrates further detail for one of the digital content receivers shown in FIG. 1.

FIG. 2 illustrates an example application specific integrated circuit ("ASIC") 210 for one of the digital content receivers shown in FIG. 1. Of course, the present invention may be practiced in a variety of environments and is in no way limited to the specific example shown in FIG. 2. The ASIC 210 includes a number of components that communicate over a control bus 211 and a memory bus 212. The control bus 211 carries relatively low bandwidth control information that controls the operation of each of the components of the ASIC 210. The memory bus 212 carries higher bandwidth information such as video information between each of the components of the ASIC 210 and memory. A bus management unit 213 manages the communication over the control bus 211 and also interfaces with a processor 214 and a PCI bus 215.

The processor 214 oversees the general video processing by dispatching instructions over the control bus 211 instructing the various components of the ASIC 210 to perform their specialized tasks. The processor 214 also monitors the progress of such tasks, thus controlling the various components of ASIC 210 in a coordinated fashion. The processor 214 may be any processor capable of performing such oversight functions including a MIPS or X86 architecture processor.

Typically, memory is required to perform such coordinated operations. Accordingly, the ASIC 210 has access to one or more memory subsystems 216 which provide volatile memory that is shared between the components of the ASIC 210. The memory subsystems 216 may be any memory subsystem that allows for rapid access to stored information. For example, the memory subsystems 216 may be SRAM or DRAM.

A memory unit 217 communicates directly with the memory subsystems 216. The memory unit 217 is more efficient if there are large, less frequent accesses to the memory subsystems 216. However, many of the components of the ASIC 210 may operate most efficiently when there are smaller, but more frequent memory transactions. The direct memory access ("DMA") unit 218 acts as a buffering interface such that the components may have small, frequent transactions with the DMA unit 218, while leaving it up to the DMA unit 218 to bundle the smaller transactions into larger, less frequent transactions for the memory unit 217 to conduct with the memory subsystems 216. In this manner, when a component needs to access the memory subsystems 216, the component either communicates directly with the memory unit 217 or communicates through the DMA unit 218 depending on the nature of the transaction.

A universal serial bus ("USB") interface 219 is capable of running a universal serial bus. The USB unit 219 may be any conventional USB interface that is capable of interfacing with the control bus 211 and the memory bus 212.

A device unit 221 includes interfaces for a number of miscellaneous devices. For example, the device unit 221 contains a bi-directional interface for an I2C bus 222 for communication with external components, a bi-directional interface for a smart card 223, a bi-directional infra red ("IR") serial interface 224, and a bi-directional ISA/IDE bus 225 that interfaces with a read only memory 226, a hard disk drive 227, and a system data store 228, as well as a number of other devices such as a DVD-ROM drive. Alternatively, the system data store 228 may be attached to the I2C bus 222.

System data store 228 is read only or write-once memory for storing certain receiver unique information that will be described in greater detail below, with respect to FIG. 3. In general, at least portions of the receiver unique information will be used to authenticate the receiver to other receivers or devices. In one embodiment, system data store 228 is an EEPROM with the write protect fuses blown. In another embodiment, system data store 228 is an ASIC attached to I2C bus 222. Nevertheless, the present invention is not necessarily limited to any particular type of storage for system data store 228 and is not limited to any particular bus for interfacing with system data store 228.

A graphics unit 242 comprises a 3-D graphic rendering engine that may be, for example, an eight million polygon DirectX7 compatible 3-D graphics unit.

An audio unit 229 drives a PC audio interface 230 such as an AC'97 audio interface that may receive or transmit audio. The audio unit 229 may also drive other audio interfaces including a digital interface such as SPDIF digital audio interface 231.

A video unit 232 receives video data from the memory bus 212 and converts the video data into a digital display. The video unit 232 handles multiple windows of video data and may operate in RGB, YUV, or other color formats as needed. The video unit 232 provides the digital display data to the digital video encoder 233 which converts the digital display data into the desired format (e.g., NTSC or HDTV) and provides the digital video through a digital to analog converter ("DAC") and filter 234 to a composite, S-Video or component output. The digital video encoder 233 also may output the video to a digital video interface ("DVI") 235 using a DVI converter 236.

An MPEG decoder 238 is provided to decode MPEG streams. The MPEG decoder also performs subsample decoding by reducing the frame size of the resulting decoded frame.

Figure 3:
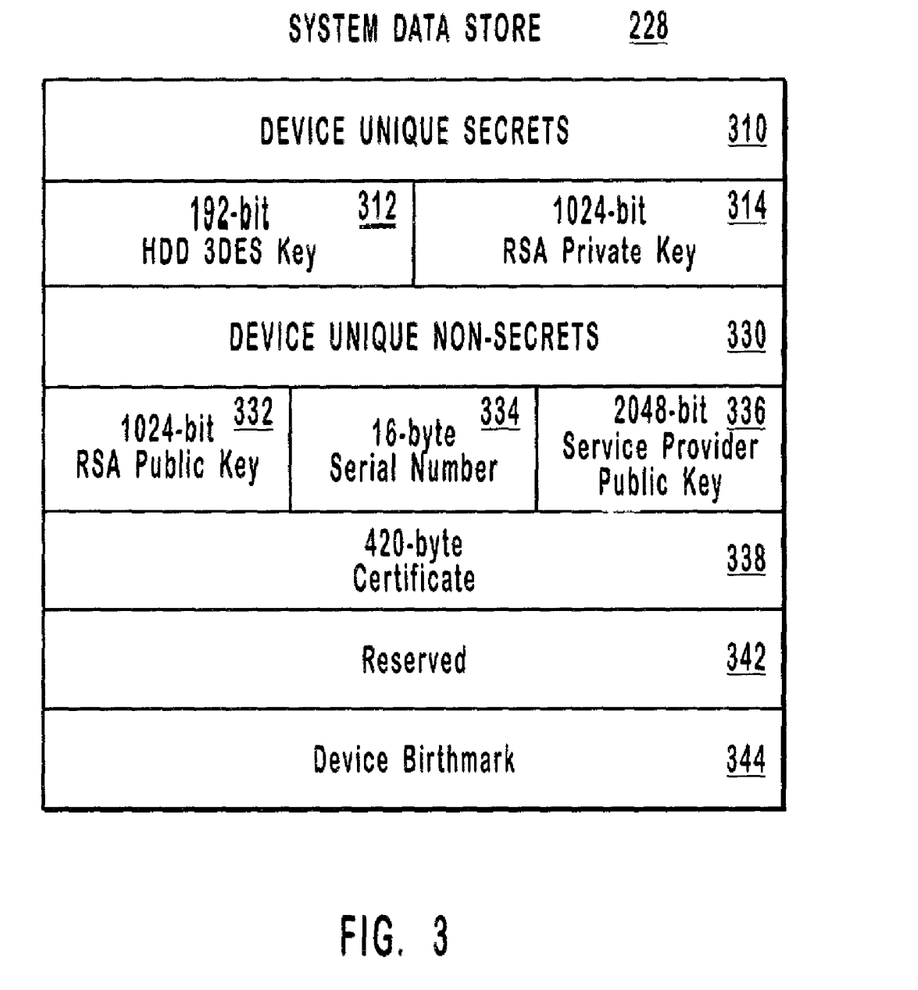
FIG. 3 is a block diagram showing an exemplary data store containing data for authenticating a receiver in accordance with the present invention.

FIG. 3 is a block diagram illustrating an exemplary system data store 228 in more detail. System data store 228 contains various data, including data useful for authenticating a receiver. Device unique secrets 310 should be kept confidential to retain maximum effectiveness. Device unique non-secrets 330 are used for authentication, but are preferably maintained in some degree of confidence for added security. For example, in one embodiment, device unique non-secrets 330 are not published or generally accessible, but are used regularly for purposes of authentication and auditing.

Device unique secrets 310 include a 192-bits for hard disk 3DES (3 key) encryption key 312 and a 1024-bit RSA private key 314. The HDD key 312 is used for encrypting HDD content and effectively ties the HDD content to a particular receiver. Attempts to access the HDD directly return only encrypted content, and because the HDD key 312 is device unique, content on an HDD that has been moved to another receiver cannot be decrypted by that receiver. The three (encrypt, decrypt, encrypt) 3DES HDD keys 312 are symmetric encryption keys. Once a symmetric encryption key becomes generally known, it offers little, if any, protection, and therefore should be kept secret. 3DES is well-known to those of ordinary skill in the relevant arts and will not be described further.

The RSA private key 314 is used for authentication and may be used to exchange symmetric session keys. Private keys are paired with public keys. Data encrypted with a public key can only be decrypted with the corresponding private key. While the public key generally is intended for disclosure, the private key should be maintained secret. A common authentication technique, known as a proof-of-possession challenge, involves asking the purported holder of a private key to decrypt a particular random number that has been encrypted with the corresponding public key. Since the random number can only be decrypted with the private key, decrypting the random number and using it in a subsequent operation proves that the purported holder in fact has possession of the private key. More sophisticated uses of RSA private key 314 will be discussed below with respect to certificate 338. RSA is well-known to those of ordinary skill in the relevant arts and will not be described further.

Device unique non-secrets 330 include a 1024-bit RSA public key 332 that corresponds to the 1024-bit RSA private key 314, a 16-byte serial number 334, a 2048-bit service provider public key 336, a 420-byte certificate, reserved area 342, and a device birthmark 344. Note that not all data in system data store 228 is unique to a particular receiver, but the combination of data in system data store 228 is unique. For example, the service provider public key 336 may be common to all receivers, whereas the serial number 334 is unique to each receiver. Therefore, it is only important for at least some portion of system data store 228 to contain data that is unique to a particular receiver.

The 2048-bit service provider public key 336 is the public key of the service provider (as opposed to a trusted third party) and is used in conjunction with the 420-byte certificate 338 for authentication. Certificate 338 is a hash of the receiver's serial number and public key, with the hash being signed by the private key that corresponds to the service provider public key 336. The certificate is approximately 420 bytes: 128 bytes for the RSA public key 332; 16 bytes for serial number 334; 20 bytes for the hash; 256 bytes for the signature; plus any encoding overhead. Examples of popular hashing algorithms include the message digest version 5 ("MD5") algorithm and the secure hash algorithm version 1 ("SHA-1"). However, the present invention does not necessarily require the use of hashing or any particular hashing algorithm.

An exemplary mutual authentication process between a local receiver and a gateway receiver may occur as follows. The local receiver initiates the authentication sequence of messages by sending his certificate to the gateway receiver. The gateway receiver validates the service provider's digital signature (by hashing the data in the certificate and applying the appropriate digital signature verification algorithm using the service provider's RSA public signature key which is in ROM), extracts the local receiver's RSA public key, and generates a proof-of-possession challenge as described in more detail below.

The challenge is a random number chosen by the gateway receiver which is encrypted in the local receiver's public RSA key. The gateway receiver then sends this encrypted random number and his own certificate to the local receiver. Only a local receiver in possession of the corresponding private key can decrypt this random number. When the local receiver gets these two pieces of data, he decrypts the challenge with his RSA private key, validates the gateway receiver's certificate (as described above), and creates an analogous proof-of-possession challenge for the gateway receiver. Within these two messages (receiver to gateway and gateway to receiver), the two receivers mutually authenticate each other and establish a first symmetric encryption (session) key to be used in subsequent communications between them. Subsequent communications may include digital video and audio data, as well as additional authentication data like the local receiver's birthmark.

Note that the certificate 338 permits a chain of trust to be established. The gateway receiver trusts the service provider's public key 336. Using the service provider's public key, the gateway receiver is able to authenticate the local receiver and add the local receiver to the gateway receiver's chain of trust. In one embodiment, the gateway receiver stores the public key of each local receiver that authenticates with the gateway receiver in a transaction table that is sent to the audit service when the gateway receiver authenticates. The local receiver is able to authenticate the gateway receiver in a similar fashion. This allows the gateway receiver to be added to the local receiver's chain of trust.

The reserved area 342 is for future expansion. In particular, the Digital Transmission Content Protection ("DTCP") standard for IEEE 1394 uses a device private key of 160 bits for full authentication and other keys of 192 bytes for restricted authentication. DTCP also specifies public (common constants) parameters: 160 bits for EC-DH group parameters, 160 bits for the coefficient of the elliptic curve polynomial (as well as other constants), and 98 bytes for a device certificate are reserved by the Digital Transmission Licensing Authority ("DTLA"). (DTLA is the body responsible for the DTCP standard.) The present invention does not necessarily require a copy control mechanism and is not limited to any particular copy control policy.

Device birthmark 344 helps assure the integrity of system data store 228. The device birthmark is a signed hash of the system data store 228 contents. As its name implies, device birthmark 344 is unique to each receiver. Hashing system data store 228 allows any changes to be detected. Like certificate 338, the system data store hash is signed with the service provider private key. Periodically, the audit service receives the birthmark of the gateway receiver and possibly the contents of system data store 228 described above. Receiving the same birthmark from multiple receivers indicates that a receiver has been cloned. Invalid birthmarks indicate a system data store and receiver that are not authorized by the service provider. By receiving the contents of system data store 228, the audit service is able to determine the extent of invalid content within the system data store. Duplicate and invalid birthmarks suggest theft of service. The birthmark may be received in conjunction with the gateway receiver authenticating to an audit service and in conjunction with a local receiver authenticating to the gateway receiver. The contents of each system data store 228 may be created by the audit service, delivered to a manufacturer on some type of storage media (separated by serial number), such as a CD, and added to each system data store 228 at the point of manufacture. As an added level of security, the audit service could require that an authorized manufacturer sign all or a portion of the data store 228 contents.

Often, data stores, such as system data store 228, are physically packaged in a manner to inhibit reverse engineering or hacking. For example, data stores may be covered in an epoxy or employ other exotic packaging techniques that interfere with the data store's operation if the package is subject to tampering. While secure packaging is effective, it also increases costs. In some circumstances, the financial risks associated with tampering may be economically insufficient to justify the increased cost of a secure package. Nevertheless, secure packaging may be necessary to assure only authorized distribution of content and services. As a result, expensive packaging may reduce the service provider's revenue or increase the cost of a service to consumers.

The security of system data store 228 may be enhanced in a variety of ways. For example, the location of data in the system data store may be varied from one receiver or group of receivers to another. The order in which the data store is signed may be varied from one receiver or group of receivers to another. The data store may be encrypted and the decryption keys received from the service provider over a secure communication channel. These additional levels of security prevent a hacker who is able to crack a single receiver, from being able to crack all receivers. Furthermore, one group of receivers may be sold only to certain markets, such as a particular geographic market, allowing for the markets that are most susceptible to cloning and/or hacking to be identified.

In one embodiment, the order in which the data store is signed may be varied by changing the physical order in which the device unique secrets 310 and device unique non-secrets 330 are stored within the data store. In common practice, data is laid out sequentially within memory. In contrast, in one embodiment of the present invention data is laid out in memory in a non-sequential fashion that is determined by a "scrambling algorithm." The scrambling algorithm generates a non-repeating sequence of memory locations within the data store to be used to store the device unique secrets 310 and the device non-unique secrets 330.

For example, this "scrambling algorithm" of the order in which to use memory locations within the data store may be accomplished with a cyclic permutation algorithm. A prime number unique to a receiver is stored in system data store 228; the prime number is larger than the size of the data region to be scrambled by the scrambling algorithm. By cycling through the device unique secrets 310 and device unique non-secrets 330, a permutation map may be created. An exemplary algorithm might operate as follows, generating the sequence $$g, g^2 \bmod p, g^3 \bmod p, \ldots, g^{p-1} \bmod p,$$

where g is a constant generator of the cyclic group $Z_p$, and p is the prime number. (Note that the mod p applies to the (g^x) expression, not just the exponent, i.e., (g^2) mod p as opposed to g ^(2 mod p), etc.) This sequence of p integers is a permutation of the sequence 1, 2, 3, . . . , p−1; each integer between 1 and p−1 inclusive will appear exactly once in the sequence g, $g^2$ mod p, $g^3$ mod p, . . . , $g^{p-1}$ mod p, Scrambling the location of data within the system data store and/or the order in which data within the system data store is signed to create birthmark 344, allows a relatively inexpensive and insecure component, such as an EEPROM, to store system data with a fair degree of confidence that the data is secure.

It should be noted that the present invention does not require any particular encryption, hashing, digital signing, authentication, or other cryptographic technology. The specific references to SHA-1, 3DES, RSA, etc., are exemplary only, and should not be interpreted as limitations on the present invention. Cryptographic support for digital signatures, encryption, block ciphers, hashes, etc., may be provided in hardware, software, and/or combinations of hardware and software. Furthermore, the identification of specific data and data sizes with respect to system data store 228 is also exemplary. Many other cryptographic techniques, data, and data size are possible and should be considered to fall within the scope of the present invention.

The present invention also may be described in terms of methods comprising functional steps and/or non-functional acts. The following description of acts and steps that may be performed in practicing the present invention, correspond to FIGS. 4-5. Usually, functional steps describe the invention from a perspective of results that are accomplished, whereas non-functional acts describe more specific actions for achieving a particular result. In some circumstances, several acts may be combined to achieve the results of a particular step. Although the functional steps and non-functional acts may be described or claimed in a particular order, the present invention is not necessarily limited to any particular ordering of the acts and/or steps.

Figure 4:
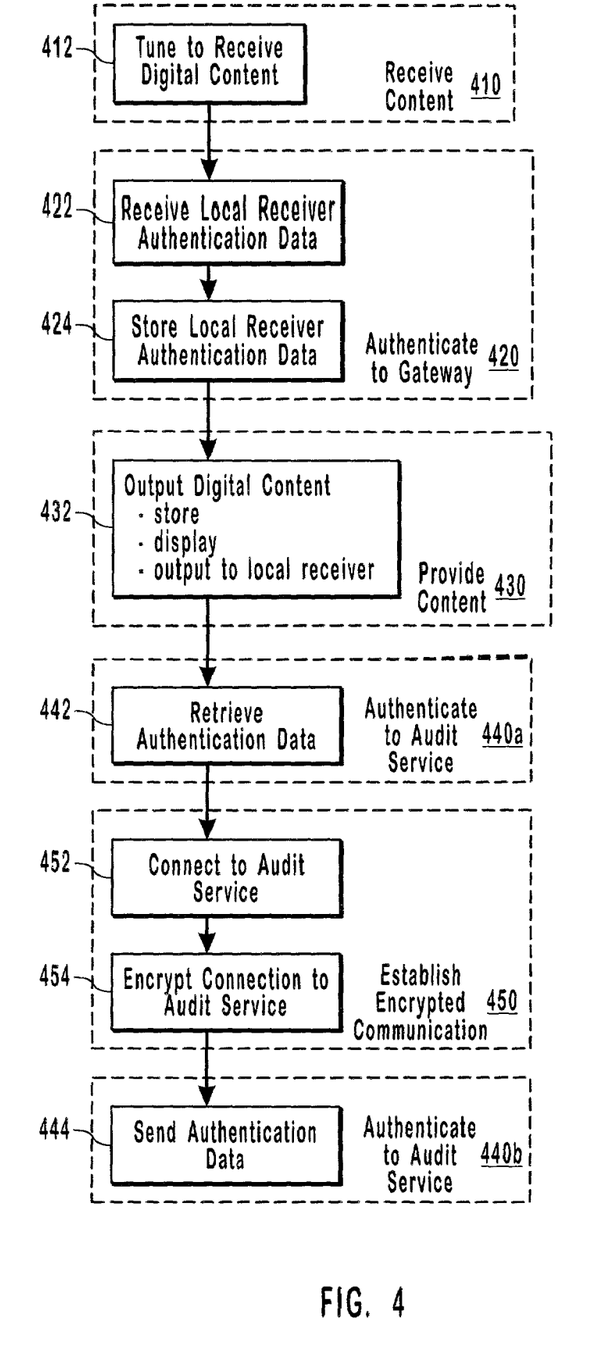
FIG. 4 is a flow diagram, from the perspective of a receiver, illustrating exemplary acts and steps for methods according to the present invention.

FIG. 4 is a flow diagram from the perspective of a receiver. A step for receiving (410) digital content that is broadcast from at least one content source may include an act of tuning (412) a gateway receiver to receive the digital content. A step for authenticating (420) one or more local receivers may include acts of receiving (422) local receiver authentication data and storing (424) a representation of the local receiver authentication data, such as the local receiver's public key. Certificate 338 and device birthmark 344 of FIG. 3 are examples of authentication data. A step for providing (430) one or more local receivers with access to received digital content may include an act of outputting (432) the received digital content. The act of outputting encompasses storing the digital content to a storage device, such as a hard disk, an optical disc, a memory, etc.; displaying the digital content on a display device; and outputting the digital content to a local receiver.

A step for authenticating (440a and 440b) to an audit service may include an act of retrieving (442) authentication data from a read only or write-once memory and an act of sending (444) the authentication data to the audit service. Again, device birthmark 344 and certificate 338 of FIG. 3 are examples of authentication data. A step for establishing (450) an encrypted communication channel with the audit service may include an act of connecting (452) to the audit service and an act of encrypting (454) the connection to the audit service.

Figure 5:
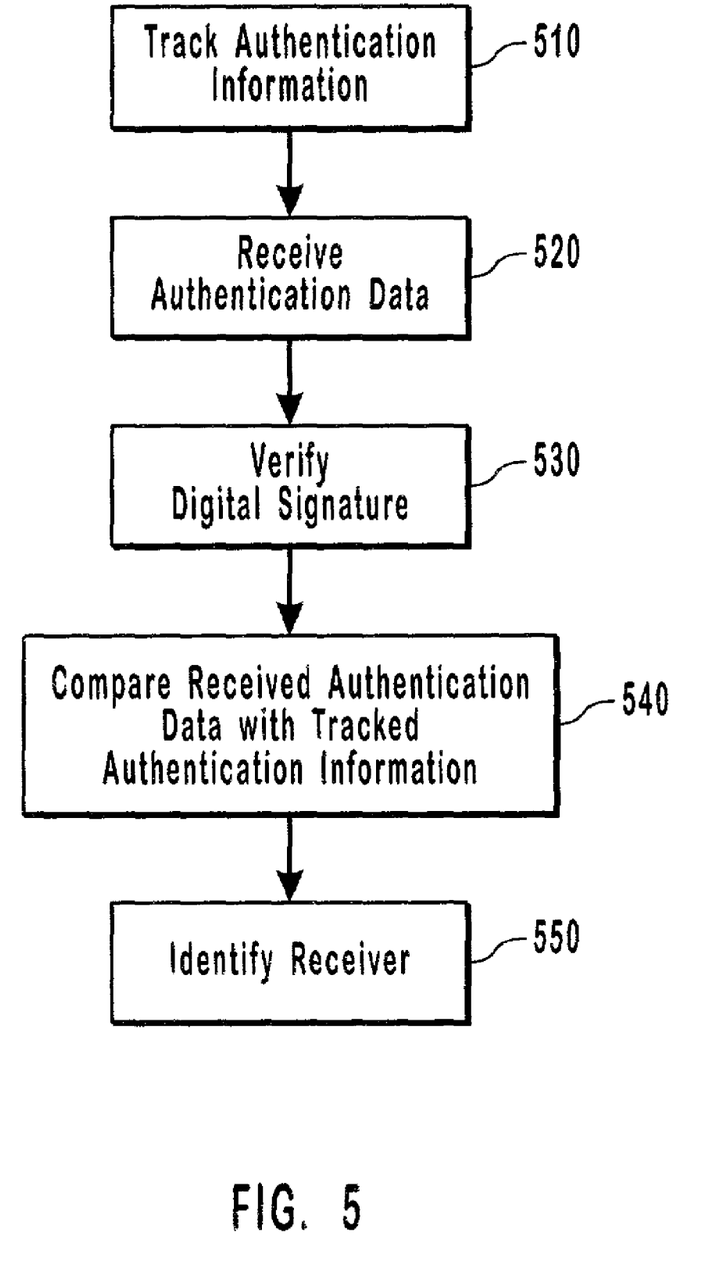
FIG. 5 is a flow diagram, from the perspective of an audit service, illustrating exemplary acts for methods according to the present invention.

FIG. 5 is a flow diagram from the perspective of an audit service. The audit service tracks (510) authentication information. This authentication information allows the audit service to identify particular receivers. In one embodiment, the audit service tracks the serial number and public key for each receiver. In another embodiment, the audit service tracks the contents of each receiver's system data store. When the audit service receives (520) authentication data, such as certificate 338 shown in FIG. 3, from a gateway receiver, the audit service determines whether the certificate was signed by the service provider's private key. If so, the audit service challenges the node to sign a specified random number to prove that the receiver has possession of the corresponding private key. A nonce value may be used to detect replay attacks. In one embodiment, a certificate is used to authenticate a gateway receiver during initial activation of the gateway receiver.

At times, the audit service receives a device birthmark as authentication data. For example, after initial activation, a gateway receiver may periodically contact the audit service, such as to communicate billing information. The authentication data also may include a representation of authentication data for local receivers that have authenticated to a gateway receiver. The audit service verifies (530) the digital signature of the birthmark. For example, the audit service may track a copy of at least a portion of the system data store of each receiver to use in verification or data derivable from at least a portion of the system data store. In one embodiment, the audit service tracks the hash value used to create the birthmark for each receiver's system data store. Next, the audit service compares (540) the received authentication data with tracked authentication information. Based on the received authentication data, the audit service identifies potentially fraudulent receivers. If the same birthmark is received from multiple receivers, the audit service may determine that a receiver has been cloned. An invalid birthmark suggests an unsuccessful and unauthorized attempt to create a system data store. If a certificate or birthmark for a particular receiver is never received, the audit service may determine that receivers are being used for unauthorized purposes. Because the service provider may subsidize the purchase of a receiver, it may be important to identify receivers that fail to contact the audit service.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of authenticating a receiver device so that potentially fraudulent receiver devices may be identified, the method comprising acts of:
receiving by an audit service authentication data from a first receiver, wherein the authentication data comprises data which should be unique to the first receiver, and comprises data from a receiver system data store, and wherein the data which should be unique to the receiver is stored in a memory that is arranged in accordance with a cyclic permutation algorithm,
the system data store comprising a device birthmark, a service provider public key, and a certificate,
the device birthmark being a signed hash of the system data store contents, and
the certificate being a signed hash of the first receiver' serial number and public key and wherein the signed hash is signed by a private key corresponding to the service provider's public key;
storing by the audit service authentication information derived from the authentication data received from the first receiver;
receiving by the audit service from a second receiver, authentication data;
comparing authentication information derived from the authentication data received from the second receiver with the authentication information derived from the authentication data received from the first receiver;
when the authentication information derived from the authentication data received from the second receiver is the same as the authentication information derived from the authentication data received from the first receiver, determining that a receiver has been cloned or is being used for unauthorized purposes.

2. A method as recited in claim 1, wherein the data received by the audit service is encrypted.

3. A method as recited in claim 1, wherein the authentication data comprises a digital signature created by digitally signing at least a portion of the data which should be unique to the receiver with a private key, and wherein the audit service is capable of verifying the digital signature.

4. A method as recited in claim 1, wherein the data which should be unique to the receiver is stored in a memory, and wherein a storage location of at least a portion of the data varies from one group of one or more receivers to another.

5. A method as recited in claim 1, wherein the data which should be unique to the receiver and received by the audit service comprises: a hard disk encryption key, a private/public key pair, a serial number, a public key for authenticating the audit server, and a receiver certificate.

6. A method as recited in claim 1, wherein authorized receivers are receiver devices with a valid subscription to receive the at least some digital content.

7. A method as recited in claim 1, wherein the authentication data is stored in either a read only memory or a write-once memory, and wherein the method further comprises an act of retrieving the authentication data from either the read only memory or the write-once memory.

8. A method as recited in claim 1, wherein a gateway receiver is coupled to one or more local receiver devices, the method further comprising acts of:
  the gateway receiver receiving local receiver authentication data from each of the one or more local receiver devices, wherein the local receiver authentication data comprises data which should be unique to each of the one or more local receiver devices;
  storing, by the gateway receiver, a representation of the local receiver authentication data; and
  sending the representation of the local receiver authentication data to the audit service, whereby the audit service is able to identify the one or more local receiver devices coupled to the gateway receiver.

9. A method as recited in claim 1, further comprising an act of either
  (i) storing digital content on a nonvolatile storage device, or
  (ii) if the digital content is digital video data, then displaying the digital content on a video display device.

10. A method as recited in claim 1, wherein the digital content comprises subscription-based content that is broadcast to one or more receivers over a satellite or cable link, and wherein the authentication data is sent to the audit service over an Internet connection.

11. A method as recited in claim 1, where in the system data store is physically packaged in a manner to inhibit reverse engineering.

12. A method as recited in claim 3, wherein the order in which data is signed to create the digital signature varies from one group of one or more receivers to another.

13. A method as recited in claim 4 wherein the storage location of at least a portion of the data varies from one group of one or more receivers to another varies according to geographic market.

14. A method as recited in claim 12 wherein the order in which data is signed to create the digital signature varies from one group of one or more receivers to another varies according to geographic market.

15. A computer program product for authenticating a receiver device so that potentially fraudulent receiver devices may be identified, the computer program product comprising a computer-readable storage medium having encoded thereon machine-executable instructions which, when executed, performs:
  receiving by an audit service authentication data from a first receiver, wherein the authentication data comprises data which should be unique to the first receiver, and comprises data from a receiver system data store, and wherein the data which should be unique to the receiver is stored in a memory that is arranged in accordance with a cyclic permutation algorithm,
  the system data store comprising a device birthmark, a service provider public key, and a certificate,
  the device birthmark being a signed hash of the system data store contents, and
  the certificate being a signed hash of the first receiver' serial number and public key and wherein the signed hash is signed by a private key corresponding to the service provider's public key;
  storing by the audit service authentication information derived from the authentication data received from the first receiver;
  receiving by the audit service from a second receiver, authentication data;
  comparing authentication information derived from the authentication data received from the second receiver with the authentication information derived from the authentication data received from the first receiver;
  when the authentication information derived from the authentication data received from the second receiver is the same as the authentication information derived from the authentication data received from the first receiver, determining that a receiver has been cloned or is being used for unauthorized purposes.

16. A computer program product as recited in claim 15, wherein the data received by the audit service is encrypted.

17. A computer program product as recited in claim 15, wherein the authentication data comprises a digital signature created by digitally signing at least a portion of the data which should be unique to the receiver with a private key, and wherein the audit service is capable of verifying the digital signature.

18. A computer program product as recited in claim 15, wherein the order in which data is signed to create the digital signature varies from one group of one or more receivers to another.

19. A computer program product as recited in claim 15, wherein the data which should be unique to the receiver is stored in a memory, and wherein a storage location of a least a portion of the data varies from one group of one or more receivers to another.

20. A computer program product as recited in claim 15, wherein the data which should be unique to the receiver and received by the audit service comprises a hard disk encryption key, a private/public key pair, a serial number, a public key for authenticating the audit server, and a receiver certificate.

21. A computer program product as recited in claim 15, wherein authorized receivers are receiver devices with a valid subscription to receive the at least some digital content.

22. A computer program product as recited in claim 15, wherein the authentication data is stored in either a read only memory or a write-once memory, and wherein the method further comprises an act of retrieving the authentication data from either the read only memory or the write-once memory.

23. A computer program product as recited in claim 15, wherein a gateway receiver is coupled to one or more local receiver devices, the method further comprising acts of:
  the gateway receiver receiving local receiver authentication data from each of the one or more local receiver devices, wherein the local receiver authentication data comprises data which should be unique to each of the one or more local receiver devices;

storing a representation of the local receiver authentication data; and sending the representation of the local receiver authentication data to the audit service, whereby the audit service is able to identify the one or more local receiver devices coupled to the gateway receiver.

24. A computer program product as recited in claim 15, the method further comprising an act of either
   (i) storing the digital content on a nonvolatile storage device, or
   (ii) displaying the digital video content on a display device.

25. A computer program product as recited in claim 15, wherein the digital content comprises subscription-based content that is broadcast to the one or more receivers over a satellite or cable link, and wherein the authentication data is sent to the audit service over an Internet connection.

26. A method of authenticating a receiver device so that potentially receiver devices may be identified, the method comprising steps for:
   at a gateway receiver, receiving digital content that is broadcast from at least one content source;
   providing access to the received digital content through the gateway receiver;
   establishing an encrypted communication channel with an audit service that is enabled to authenticate the gateway receiver; and
   authenticating to the audit service, wherein authentication permits the audit service to identify potentially fraudulent receiver devices by the audit service
      comparing authentication information derived from authentication data received from a second receiver with authentication information derived from authentication data having been received from a first receiver,
      wherein the authentication data comprises data which should be unique to each receiver, comprises data from a receiver system data store, the system data store comprising a device birthmark, a service provider public key, and a certificate, the device birthmark being a signed hash of the system data store contents, and the certificate being a signed hash of the first receiver's serial number and public key and wherein the signed hash is signed by a private key corresponding to the service provider's public key; and
      when the authentication information derived from the authentication data received from the second receiver is the same as the authentication information derived from the authentication data received from the first receiver, determining that a receiver has been cloned or is being used for unauthorized purposes;
   wherein the step for authenticating to the audit service comprises an act of sending authentication data to the audit service, the authentication data comprising a digital signature created by digitally signing at least a portion of data which should be unique to the gateway receiver with a private key, and wherein the audit service is capable of verifying the digital signature wherein the authentication data is stored in a memory with the order of use for one or more individual memory locations being scrambled by a cyclic permutation algorithm; and
   wherein a prime number unique to the receiver is stored in the system data store and the prime number is larger than the size of the data region to be scrambled.

27. A method as recited in claim 26, wherein the prime number is used to generate a cyclic permutation group.

28. A computer program product comprising a computer-readable storage medium having encoded thereon machine-executable instructions, for authenticating a receiver device so that potentially fraudulent receiver devices may be identified, the machine-executable instructions, when executed performing:
   at a gateway receiver, receiving digital content that is broadcast from at least one content source;
   providing access to the received digital content through the gateway receiver;
   establishing an encrypted communication channel with an audit service that is enabled to authenticate the gateway receiver; and
   authenticating to the audit service, wherein authentication permits the audit service to identify potentially fraudulent receiver devices by the audit service
      comparing authentication information derived from authentication data received from a second receiver with authentication information derived from authentication data having been received from a first receiver,
      wherein the authentication data comprises data which should be unique to each receiver, comprises data from a receiver system data store, the system data store comprising a device birthmark, a service provider public key, and a certificate, the device birthmark being a signed hash of the system data store contents, and the certificate being a signed hash of the first receiver's serial number and public key and wherein the signed hash is signed by a private key corresponding to the service provider's public key; and
      when the authentication information derived from the authentication data received from the second receiver is the same as the authentication information derived from the authentication data received from the first receiver, determining that a receiver has been cloned or is being used for unauthorized purposes;
   wherein the step for authenticating to the audit service comprises an act of sending authentication data to the audit service, the authentication data comprising a digital signature created by digitally signing at least a portion of data which should be unique to the gateway receiver with a private key, and wherein the audit service is capable of verifying the digital signature;
   wherein the authentication data is stored in a memory with the order of use for one or more individual memory locations being scrambled by a cyclic permutation algorithm; and
   wherein a prime number unique to the receiver is stored in the system data store and the prime number is larger than the size of the data to be scrambled.

29. A computer program product as recited in claim 28, wherein the prime number is used to generate a cyclic permutation group.

* * * * *